United States Patent [19]

Stein

[11] 4,336,788
[45] Jun. 29, 1982

[54] HICKORY SMOKE BARBECUE OVEN

[76] Inventor: Ed Stein, 500 Laketower Dr. - 5 Pl., Lexington, Ky. 40502

[21] Appl. No.: 195,294

[22] Filed: Oct. 8, 1980

[51] Int. Cl.³ .............................................. A47J 37/00
[52] U.S. Cl. ...................................... 126/8; 99/480; 99/482
[58] Field of Search ................. 126/21 R, 8; 99/467, 99/482, 477, 480, 481

[56] References Cited

U.S. PATENT DOCUMENTS

| | | | |
|---|---|---|---|
| 1,349,784 | 8/1920 | Saunders | 126/8 |
| 2,350,948 | 6/1944 | Walker | 126/8 |
| 2,968,301 | 1/1961 | Cowart | 126/8 |
| 3,130,662 | 4/1964 | Robinson | 99/482 |
| 3,413,912 | 12/1968 | Phelan et al. | 99/446 |
| 3,903,788 | 9/1975 | Freeland et al. | 99/481 |

Primary Examiner—Albert W. Davis
Assistant Examiner—J. Huang

[57] ABSTRACT

A barbecue oven for hickory smoking large quantities of meats with quality results; the oven including an oven component with chimney thereupon, the oven having automation controls and a large doorway, so that a truck loaded with meats on racks can be rolled directly into the oven.

1 Claim, 3 Drawing Figures

U.S. Patent  Jun. 29, 1982  4,336,788
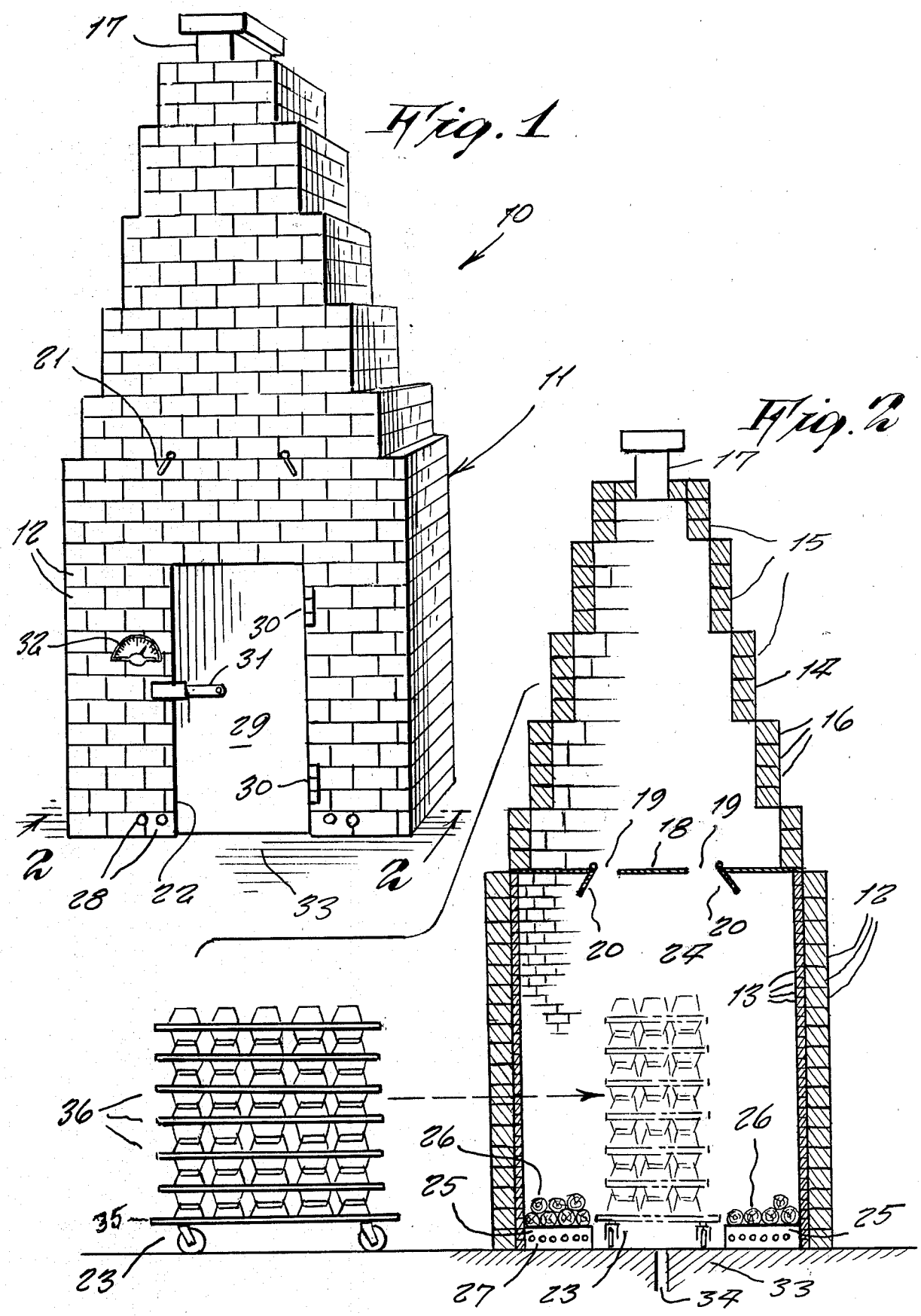

HICKORY SMOKE BARBECUE OVEN

This invention relates generally to ovens that are used for barbecuing foods.

It is well known, to those persons who are acquainted with the particular field, that it is virtually impossible to find equipment, on the market today, that will produce a high quality, controlled hickory smoked product. Accordingly, many persons still use old equipment, and are obliged to rely on their own instinct, for controlling the barbecuing operation. This old-fashioned situation is objectionable, and makes it difficult to produce a desired quality of smoked products in large quantities, so as to accommodate a wholesale business, and is, therefore, in need of an improvement.

Accordingly, it is a principal object of the present invention to provide a hickory smoke barbecue oven, which has all the necessary controls for a modern automation of such ovens, to produce a top quality product on a large scale.

Another object is to provide a hickory smoke barbecue oven, which eliminates the use of standard oven racks, which are manually handled; the present invention uses truck-type racks, wherein meats can be loaded upon the racks while on a truck outside the oven, and the the loaded truck can conveniently be rolled directly into the oven.

Another object is to provide a hickory smoke barbecue oven, wherein, accordingly, the cleaning of the oven can be done in approximately fifteen minutes, simply by removing the drip pans, and replacing them with clean ones.

Other objects of the present invention are to provide a hickory smoke barbecue oven, which is simple in design, inexpensive to manufacture, rugged in construction, easy to use and efficient in operation.

These, and other objects, will be readily evident upon a study of the following specification and the accompanying drawing wherein:

FIG. 1 is a front perspective view of the invention; and

FIG. 2 is a cross-sectional view, on line 2—2 of FIG. 1, and showing a smoked food rack that is rolled inside the oven.

Referring now to the drawing in greater detail, the reference numeral 10 represents a hickory smoke barbecue oven, according to the present invention, wherein the same is constructed with an oven component 11 thereof made of twelve inch outside blocks 12, and an inner liner of fire brick 13. A chimney 14, integral therewith, comprises a series of set-backs 15, constructed of eight inch blocks 16, and which, at its upper end, has a smoke outlet pipe 17.

A steel plate 18, between the oven component and chimney, is provided with vents 19, adjustably closable by flap doors 20, controlled by outside handles 21, at the front of the oven.

A doorway 22, on the front side of the oven, allows trucks 23 to be rolled therethrough, into the oven interior 24. A log rack 25, along each side of the interior, serves to hold hickory logs 26 thereupon. Gas burners 27 are located under the racks. Gas valves 28, for the burners, are located on the oven front wall. A stainless steel door 29, on hinges 30, closes the doorway opening, and is secured by a latch 31. A temperature control unit 32, mounted outside of the front wall, allows setting the interior temperature manually. The oven is built upon a concrete floor 33, provided with a floor drain 34.

The hickory smoke barbecue oven may be constructed according to the following dimensions, for a practical size. The oven component measures eight feet wide, eight feet long and eight feet high. The chimney is eight feet tall. The doorway measures three feet wide, and six and one-half feet high.

The truck includes a dolly 35, with swivel wheels, and upon which racks 36 are stacked. The racks may comprise baskets, as shown, for containing meats or other foods, or the meats may be placed directly thereupon, a removable drip pan being therebeneath, so as to catch dripping grease. All materials are approved by U.S.D.A., and easily cleaned. Materials are non-conductive of heat. The dolly wheels operate in temperatures from minus thirty degrees Fahrenheit to four hundred fifty degrees Fahrenheit.

While various changes may be made in the detail construction, it is understood that such changes will be within the spirit and scope of the present invention, as is defined by the appended claims.

What I now claim is:

1. A hickory smoke barbecue oven, comprising, in combination, an oven component, a chimney thereupon, fixedly connected thereto, said oven component and said chimney being constructed of blocks, an inner liner of fire brick inside said oven member, said chimney being upwardly converged by stepped set backs, a smoke outlet pipe protruding upward from an upper end of said chimney; a steel plate between said oven component and said chimney, a plurality of vents through said plate adjustably closable by flap doors affixed to exterior handles; a doorway on the front side of said oven component, a steel door hinged in said doorway, a log rack along each side of an interior of said oven component, a gas burner under each said rack and gas valves on an exterior of said oven component front wall, a temperature control unit also mounted on said front wall; and a truck movable through said doorway, comprising a dolly and stacked racks thereupon, a concrete floor upon which said oven component is placed, and a drain opening in said floor communicating with said oven component interior; said doorway being at a center of said front wall, so that said truck is between said log racks when moved into said oven component.

* * * * *